US010903706B2

(12) United States Patent
Wakui

(10) Patent No.: US 10,903,706 B2
(45) Date of Patent: Jan. 26, 2021

(54) ROTOR OF ROTARY ELECTRIC MACHINE

(71) Applicant: HONDA MOTOR CO., LTD., Tokyo (JP)

(72) Inventor: Shigeharu Wakui, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 35 days.

(21) Appl. No.: 16/437,240

(22) Filed: Jun. 11, 2019

(65) Prior Publication Data

US 2019/0379250 A1    Dec. 12, 2019

(30) Foreign Application Priority Data

Jun. 12, 2018  (JP) .................................. 2018-112128

(51) Int. Cl.
*H02K 1/32*     (2006.01)
*H02K 1/27*     (2006.01)

(52) U.S. Cl.
CPC ............... *H02K 1/32* (2013.01); *H02K 1/276* (2013.01)

(58) Field of Classification Search
CPC ........ H02K 1/32; H02K 1/276; H02K 1/2766; H02K 9/19

See application file for complete search history.

(56) References Cited

U.S. PATENT DOCUMENTS

| 5,770,903 A * | 6/1998 | Bland ...................... H02K 9/19 310/64 |
| 2015/0052936 A1* | 2/2015 | Yokoyama .......... F04C 29/0021 62/470 |

FOREIGN PATENT DOCUMENTS

| JP | 2008-219960 A | 9/2008 |
| JP | 2008-312343 A | 12/2008 |

\* cited by examiner

*Primary Examiner* — Emily P Pham
(74) *Attorney, Agent, or Firm* — Paratus Law Group, PLLC

(57) ABSTRACT

A rotor of a rotary electric machine includes a rotor core, magnets, and a rotor shaft. The rotor shaft includes a refrigerant passage, a refrigerant supply part provided on one side of the refrigerant passage and configured to supply the refrigerant from the rotor shaft to the rotor core, a refrigerant discharge part provided on the other side of the refrigerant passage and configured to return the refrigerant from the rotor core to the rotor shaft, and a passage partition part configured to block flow of the refrigerant between the one side and the other side of the refrigerant passage. The rotor core includes a plurality of heat exchange chambers having a circumferential length larger than a radial length, and the heat exchange chamber communicates with the refrigerant supply part on one side of the refrigerant passage and communicates with the refrigerant discharge part on the other side.

10 Claims, 9 Drawing Sheets

ROTOR OF ROTARY ELECTRIC MACHINE

CROSS-REFERENCE TO RELATED APPLICATIONS

This application is based on and claims priority under 35 USC 119 from Japanese Patent Application No. 2018-112128 filed on Jun. 12, 2018.

TECHNICAL FIELD

The present invention relates to a rotor of a rotary electric machine mounted on an electric vehicle or the like.

BACKGROUND ART

In recent years, in a hybrid vehicle or an EV vehicle in which a rotary electric machine is used as a driving source, there occurs a problem that is temperature rise of a permanent magnet having a large effect on the performance of the rotary electric machine. Thus, it is necessary to perform cooling efficiently.

In the rotary electric machine described in JP-A-2008-312343, a rotor is cooled in such a manner that a refrigerant supplied from a rotor shaft into a rotor core is discharged from an end surface of the outer peripheral side of the rotor core by using a centrifugal force.

In the rotary electric machine described in JP-A-2008-219960, the rotor is cooled in such a manner that the refrigerant flowing from an end portion of one end-side of the rotor shaft to the rotor shaft is supplied to the rotor core on the one end-side to flow through the inside of the rotor core along an axial direction. Further, the refrigerant cooling the inside of the rotor core returns to the rotor shaft on the other end-side of the rotor shaft to be discharged from the end portion of the other end-side of the rotor shaft.

SUMMARY

However, in the rotary electric machine described in JP-A-2008-312343, the power of the rotary electric machine is partially used as a kinetic energy of the refrigerant supplied into the rotor core as well as the rotor. Thus, the operating efficiency of the rotary electric machine is deteriorated.

In addition, in the rotary electric machine described in JP-A-2008-219960, small refrigerant passages having a circular cross section are formed at predetermined intervals in a circumferential direction of the rotor core. Thus, only the vicinity of the refrigerant passage can be cooled, and the rotor cannot be cooled uniformly in the circumferential direction.

The invention provides a rotor of a rotary electric machine in which deterioration of an operating efficiency can be suppressed, and cooling is performed properly.

According to the first aspect of the present invention, there is provided a rotor of a rotary electric machine comprising:

a rotor core:

a plurality of magnets arranged in the rotor core; and a rotor shaft which rotates integrally with the rotor core, wherein the rotor shaft includes:

a refrigerant passage through which a refrigerant passes;

a refrigerant supply part which is provided on one side of the refrigerant passage in an axial direction and configured to supply the refrigerant from the rotor shaft to the rotor core;

a refrigerant discharge part which is provided on the other side of the refrigerant passage in the axial direction and configured to return the refrigerant from the rotor core to the rotor shaft, and a passage partition part which is configured to block flow of the refrigerant between the one side of the refrigerant passage in the axial direction and the other side of the refrigerant passage in the axial direction, wherein the rotor core includes:

a plurality of heat exchange chambers which are provided in the circumferential direction, the heat exchange chamber has a circumferential length, which is a maximum length in a circumferential direction, larger than a radial length which is a maximum length in a radial direction, and the heat exchange chamber communicates with the refrigerant supply part on one side of the refrigerant passage in the axial direction and communicates with the refrigerant discharge part on the other side of the refrigerant passage in the axial direction.

According to the second aspect of the present invention, there is provided a rotor of a rotary electric machine comprising:

a rotor core;

a plurality of magnets arranged in the rotor core; and a rotor shaft which rotates integrally with the rotor core.

wherein the rotor shaft includes:

a refrigerant passage through which a refrigerant passes, a refrigerant supply part which is provided on one side of the refrigerant passage in an axial direction and supplies the refrigerant from the rotor shaft to the rotor core, a refrigerant discharge part which is provided on the other side of the refrigerant passage in the axial direction and configured to return the refrigerant from the rotor core to the rotor shaft, and a passage partition part which is configured to block flow of the refrigerant between the one side of the refrigerant passage in the axial direction and the other side of the refrigerant passage in the axial direction, wherein the rotor core includes:

a plurality of heat exchange chambers which are provided in the circumferential direction, a refrigerant supply chamber which is arranged to be separate from the heat exchange chamber in the circumferential direction, and a refrigerant discharge chamber which is arranged to be separate from the heat exchange chamber in the circumferential direction, wherein the refrigerant supply chamber communicates with the refrigerant supply part and communicates with the heat exchange chamber, and the refrigerant discharge chamber communicates with the refrigerant discharge part and communicates with the heat exchange chamber.

According to the first aspect, the refrigerant supplied to the refrigerant passage of the rotor shaft flows from the refrigerant supply part provided on one side of the refrigerant passage in the axial direction into the heat exchange chamber, so as to exchange heat with the rotor core in the heat exchange chamber. The refrigerant after heat exchange is discharged from the rotor shaft through the refrigerant discharge part provided on the other side in the axial direction of the refrigerant passage from the heat exchange chamber. Therefore, when the refrigerant for cooling the rotor is discharged from the rotor shaft, the loss of the kinetic energy can be suppressed, and the deterioration of the operating efficiency of the rotary electric machine can be suppressed. In addition, the refrigerant exchanges heat with the rotor core in the heat exchange chamber formed such that the circumferential length is larger than the radial length, whereby a wide range in the circumferential direction can be cooled. Further, since a plurality of heat exchange chambers are provided in the circumferential direction, each flow passage connected with the heat exchange chambers in the circumferential direction is shortened, whereby the rotor can be cooled uniformly.

According to the second aspect, the refrigerant supplied to the refrigerant passage of the rotor shaft flows from the refrigerant supply part provided in one side of the refrigerant passage in the axial direction to the heat exchange chamber and exchanges heat with the rotor core in the heat exchange chamber. The refrigerant after the heat exchange is discharged from the heat exchange chamber through the refrigerant discharge part provided in the other side of the refrigerant passage in the axial direction to the refrigerant passage. Therefore, when the refrigerant for cooling the rotor is discharged from the rotor shaft, the loss of the kinetic energy of the rotor can be suppressed, and the deterioration of the operating efficiency of the rotary electric machine can be suppressed. In addition, the refrigerant flows from the refrigerant supply part to the refrigerant supply chamber, the heat exchange chamber, and the refrigerant discharge chamber in the circumferential direction to be discharged to the refrigerant discharge part, whereby the wide range of the circumferential direction can be cooled. Further, since the plurality of heat exchange chambers are provided in the circumferential direction, each flow passage is shortened, whereby the rotor can be cooled uniformly in the axial direction as well as in the circumferential direction.

DESCRIPTION OF EMBODIMENTS

Hereinafter, one embodiment of a rotor of a rotary electric machine of the invention is described on the basis of the accompanying drawings.

Figure 1:
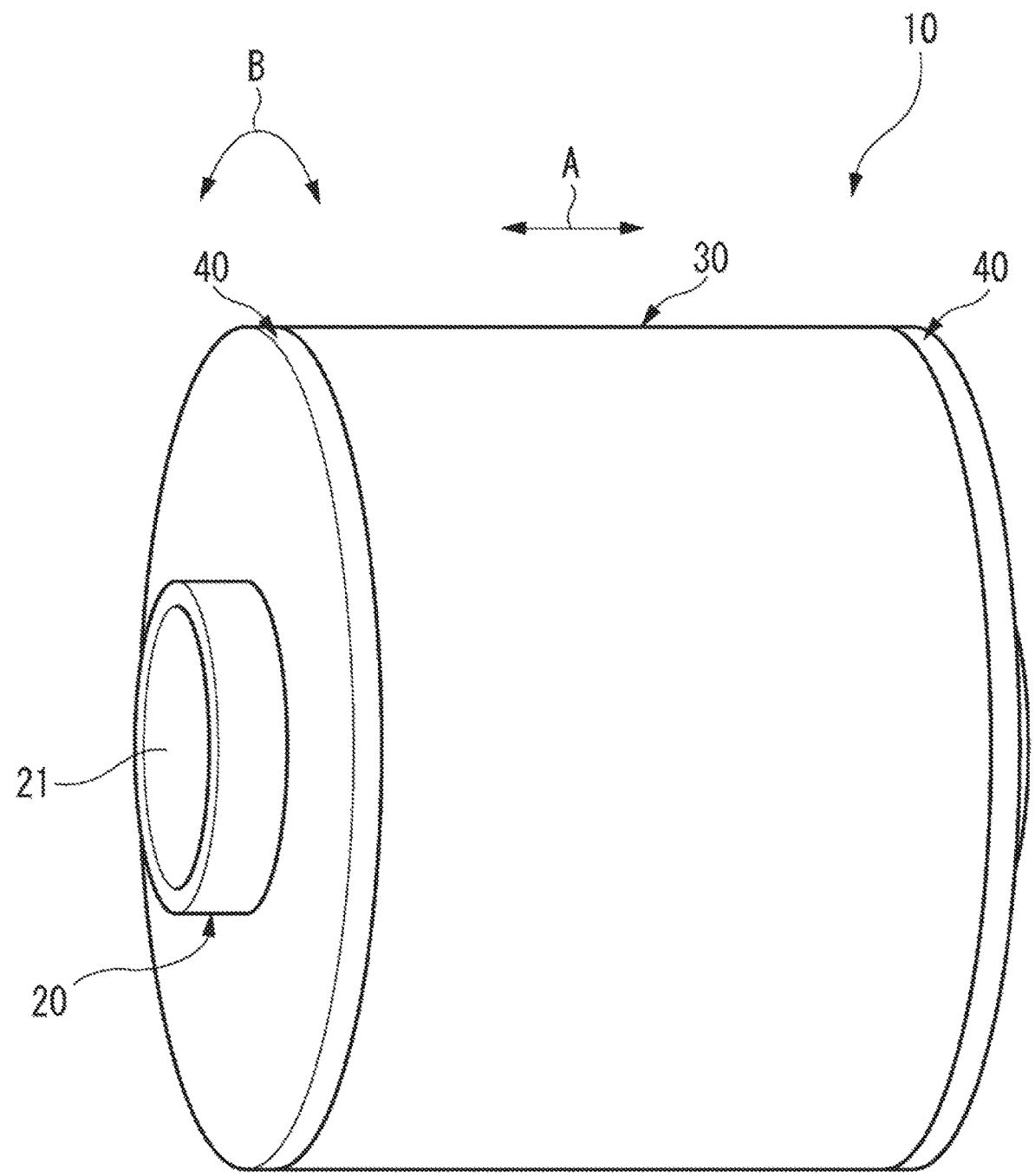
FIG. 1 is a perspective view of a rotor of a rotary electric machine of one embodiment of the invention.
Figure 2:
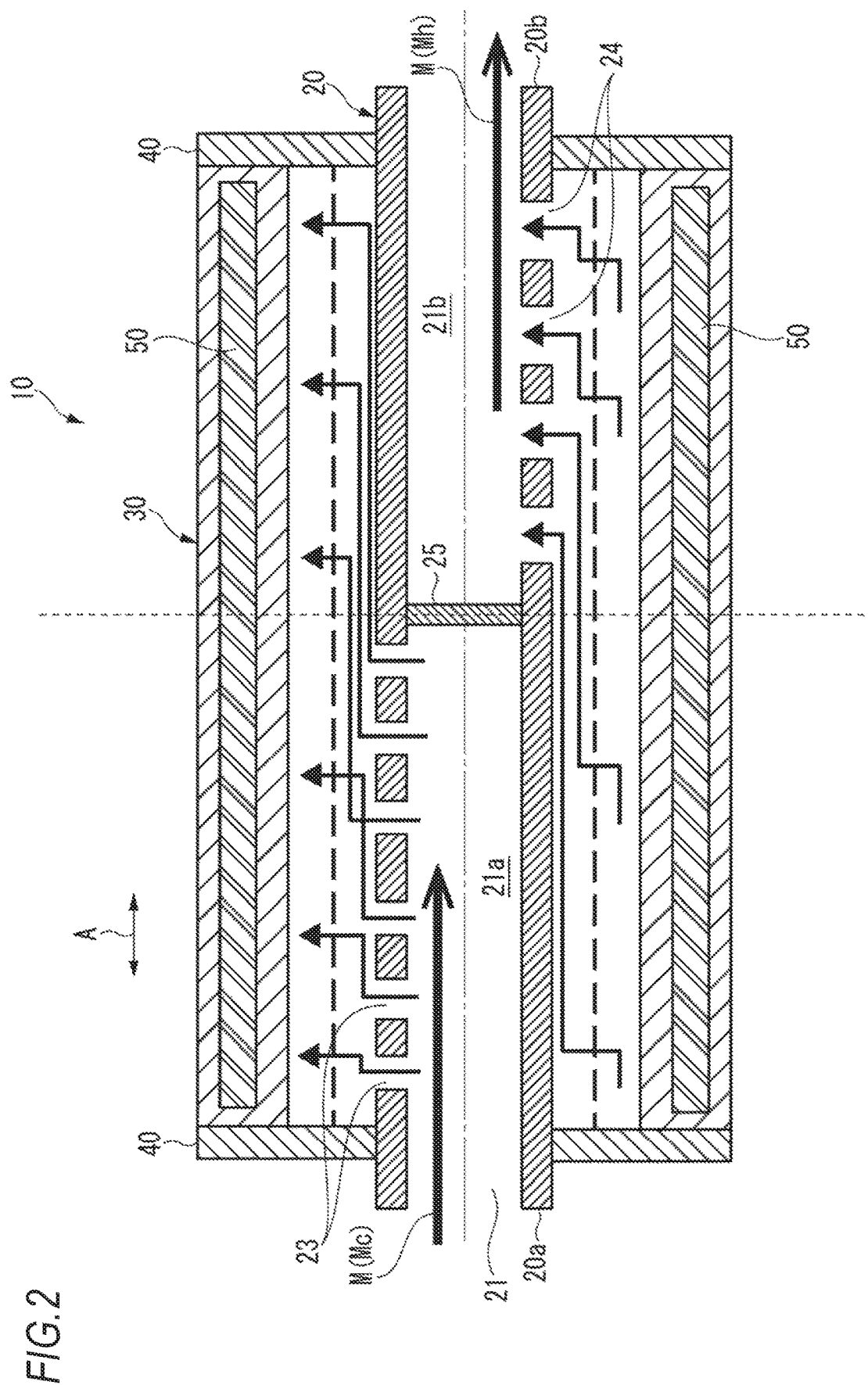
FIG. 2 is a sectional view schematically illustrating the rotor of FIG. 1.

As illustrated in FIGS. 1 and 2, a rotor of a rotary electric machine 10 of this embodiment includes a tubular rotor shaft 20, a rotor core 30 pivotally supported by the rotor shaft 20, and a pair of end plates 40 arranged on both sides of the rotor core 30 in an axial direction (the direction of arrow A).

The rotor shaft 20 is rotated integrally with the rotor core 30, and includes a refrigerant passage 21 through which a refrigerant M passes, a refrigerant supply part 23 which is provided on one side of the refrigerant passage 21 in the axial direction (a left side in FIG. 2) and supplies the refrigerant M (a refrigerant Mc of low temperature) from the rotor shaft 20 to the rotor core 30, a refrigerant discharge part 24 which is provided on the other side of the refrigerant passage 21 in the axial direction (a right side in FIG. 2) and returns the refrigerant M (a refrigerant Mh of high temperature) from the rotor core 30 to the rotor shaft 20, and a passage partition part 25 which blocks the flow of the refrigerant between one side (the left side in FIG. 2) and the other side (the right side in FIG. 2) of the refrigerant passage 21 in the axial direction. For example, an automatic transmission fluid (ATF) is used as the refrigerant M, and a supply path is formed such that the ATF circulates between a transmission case and a motor housing.

More specifically, the refrigerant passage 21 is configured by the internal space of the hollow rotor shaft 20 and extends in the axial direction of the rotor shaft 20. The refrigerant passage 21 is partitioned into a refrigerant supply passage (a flow passage on the left side in FIG. 2) 21a and a refrigerant discharge passage (a flow passage on the right side in FIG. 2) 21b by the passage partition part 25. The refrigerant supply part 23 is configured by a through hole which penetrates a pipe wall on the refrigerant supply passage 21a side of the rotor shaft 20. The refrigerant discharge part 24 is configured by a through hole which penetrates a pipe wall on the refrigerant discharge passage 21b side of the rotor shaft 20. The plurality of refrigerant supply parts 23 and the plurality of refrigerant discharge parts 24 are provided in the axial direction (the direction of arrow A) and the circumferential direction (the direction of arrow B) of the rotor shaft 20. The refrigerant M is supplied from a one end 20a side of the rotor shaft 20 in the axial direction into the refrigerant passage 21 (refrigerant supply passage 21a) and is supplied into the rotor core 30 through the refrigerant supply part 23. Then, the refrigerant returns into the refrigerant passage 21 (refrigerant discharge passage 21b) through the refrigerant discharge part 24 and is discharged from another end 20b side of the rotor shaft 20 in the axial direction.

Figure 3:
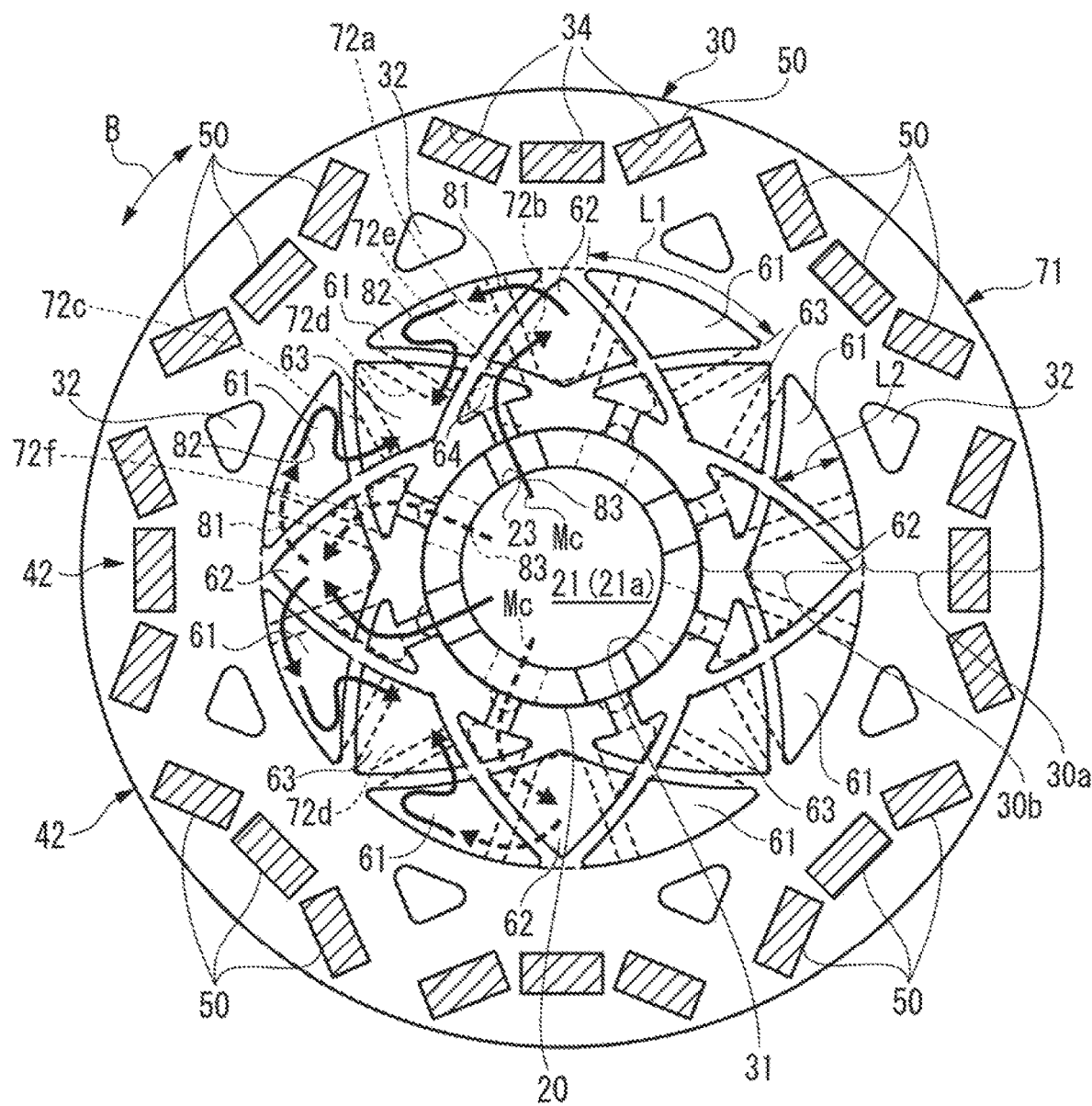
FIG. 3 is a view for explaining an internal structure of a refrigerant supply passage of the rotor of FIG. 2.
Figure 4:
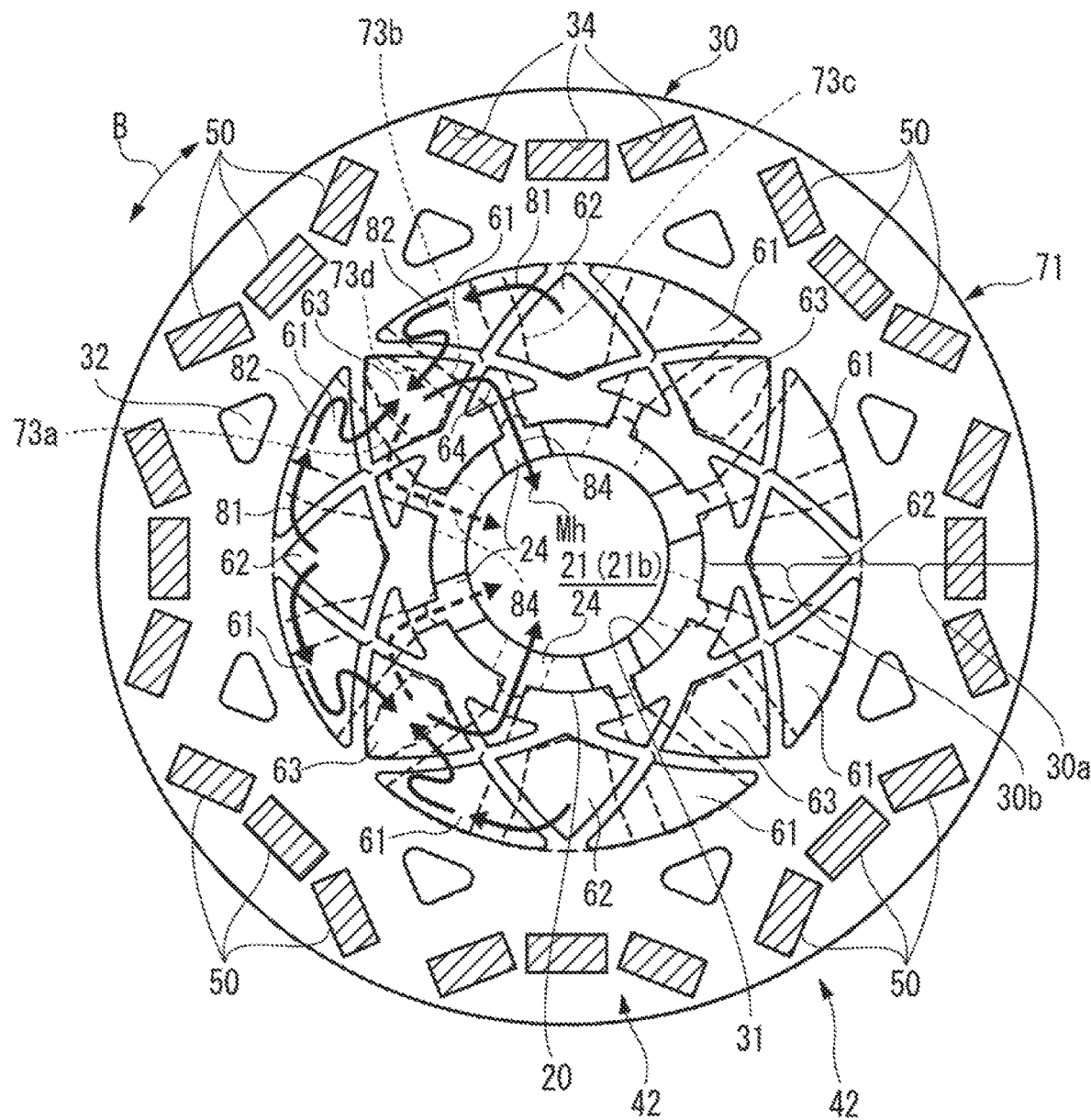
FIG. 4 is a view for explaining an internal structure of a refrigerant discharge passage of the rotor of FIG. 2.

As illustrated in FIGS. 3 and 4, the rotor core 30 has an outer peripheral part 30a in which a plurality of (twenty four in this embodiment) magnet insertion holes 34 for burying magnets 50 are provided and a spoke inner peripheral part 30b which is coupled to the rotor shaft 20. A shaft insertion hole 31 is formed to penetrate the center of the rotor core 30 in the axial direction.

The magnet insertion hole 34 is a hole having a substantially rectangular cross section. A plurality of sets (eight sets in this embodiment) which is each configured by three magnet insertion holes 34 arranged to be opened in a substantially V shape toward the outer diameter side of the rotor core 30 are arranged at equal intervals in the circumferential direction. In addition, a plurality of (eight in this embodiment) thin parts 32 are formed at predetermined intervals in the circumferential direction to be positioned closer to the inner peripheral part 30b than the magnet insertion hole 34 in the outer peripheral part 30a of the rotor core 30.

For example, the magnet 50 is a permanent magnet such as a neodymium magnet. One magnetic pole 42 is configured by three magnets 50 arranged in one set of the magnet insertion holes 34. That is, in this embodiment, eight magnetic poles 42 are formed in the rotor 10.

Figure 5A:
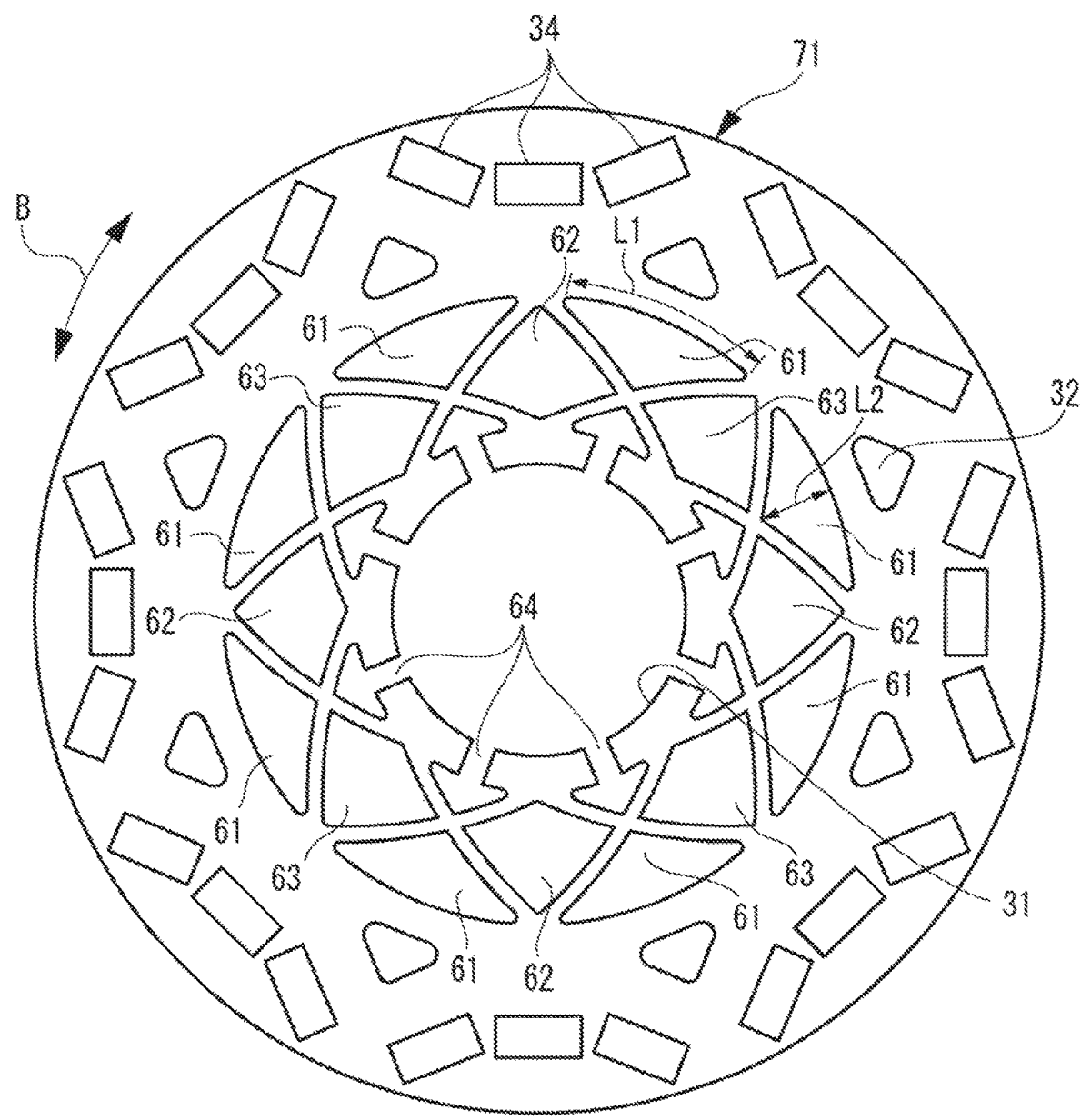
FIG. 5A is a front view of a main steel plate of the rotor of FIG. 1.

With reference to FIG. 5A, a plurality of (eight in this embodiment) of heat exchange chambers 61 contacting the outer peripheral part 30a are provided at equal intervals in the circumferential direction in the inner peripheral part 30b of the rotor core 30. The heat exchange chamber 61 is formed in a substantially fan shape, and an arc portion is in contact with the outer peripheral part 30a. In the heat exchange chamber 61, the length in the circumferential direction becomes larger toward the outer diameter side, and a circumferential length L1 which is a maximum length in the circumferential direction is larger than a radial length L2 which is the maximum length in the radial direction.

Hereinafter, the rotor core 30 will be described in detail.

The rotor core 30 is configured by laminating a plurality (for example, several hundred) of annular steel plates (electromagnetic steel plate). The portion on one side of the rotor core 30 in the axial direction, that is, the portion positioned on a radial outside of the refrigerant supply passage 21a in the radial direction is configured by a laminate body of main steel plates 71 (FIG. 5A) and a supply side exclusive steel plate 72 (FIG. 5B) interposed between the laminate bodies of the main steel plates 71 (FIG. 5A). In addition, the portion on the other side of the rotor core 30 in the axial direction, that is, the portion positioned on a radial outside of the refrigerant discharge passage 21b in the radial direction is configured by a laminate body of the plural main steel plates 71 (FIG. 5A) and a discharge side exclusive steel plate 73 (FIG. 5C) interposed between the laminate bodies of the main steel plates 71 (FIG. 5A). The supply side exclusive steel plate 72 is provided at the position of the refrigerant supply part 23. The discharge side exclusive steel plate 73 is provided at the position of the refrigerant discharge part 24. The rotor core 30 is configured by three kinds of steel plates including the main steel plate 71, the supply side exclusive steel plate 72, and the discharge side exclusive steel plate 73. Thus, the steel plate configuring the rotor core 30 can be manufactured and managed easily.

As illustrated in FIG. 5A, the main steel plate 71 includes the heat exchange chambers 61 arranged at equal intervals in the circumferential direction, the refrigerant supply chambers 62 and the refrigerant discharge chambers 63 alternately arranged between the heat exchange chambers 61 adjacent in the circumferential direction, and the connection chambers 64 arranged between the refrigerant supply chambers 62 and the refrigerant discharge chambers 63 in the circumferential direction on the inner peripheral side of the heat exchange chambers 61. That is, the refrigerant supply chamber 62 is arranged to be separate from the heat exchange chamber 61 in the circumferential direction, and the refrigerant discharge chamber 63 is arranged to be separate from the heat exchange chamber 61 in the circumferential direction. Since the plurality of main steel plates 71 are laminated, the heat exchange chamber 61, the refrigerant supply chamber 62, the refrigerant discharge chamber 63, and the connection chamber 64 are formed along the axial direction of the rotor core 30.

Figure 5B:
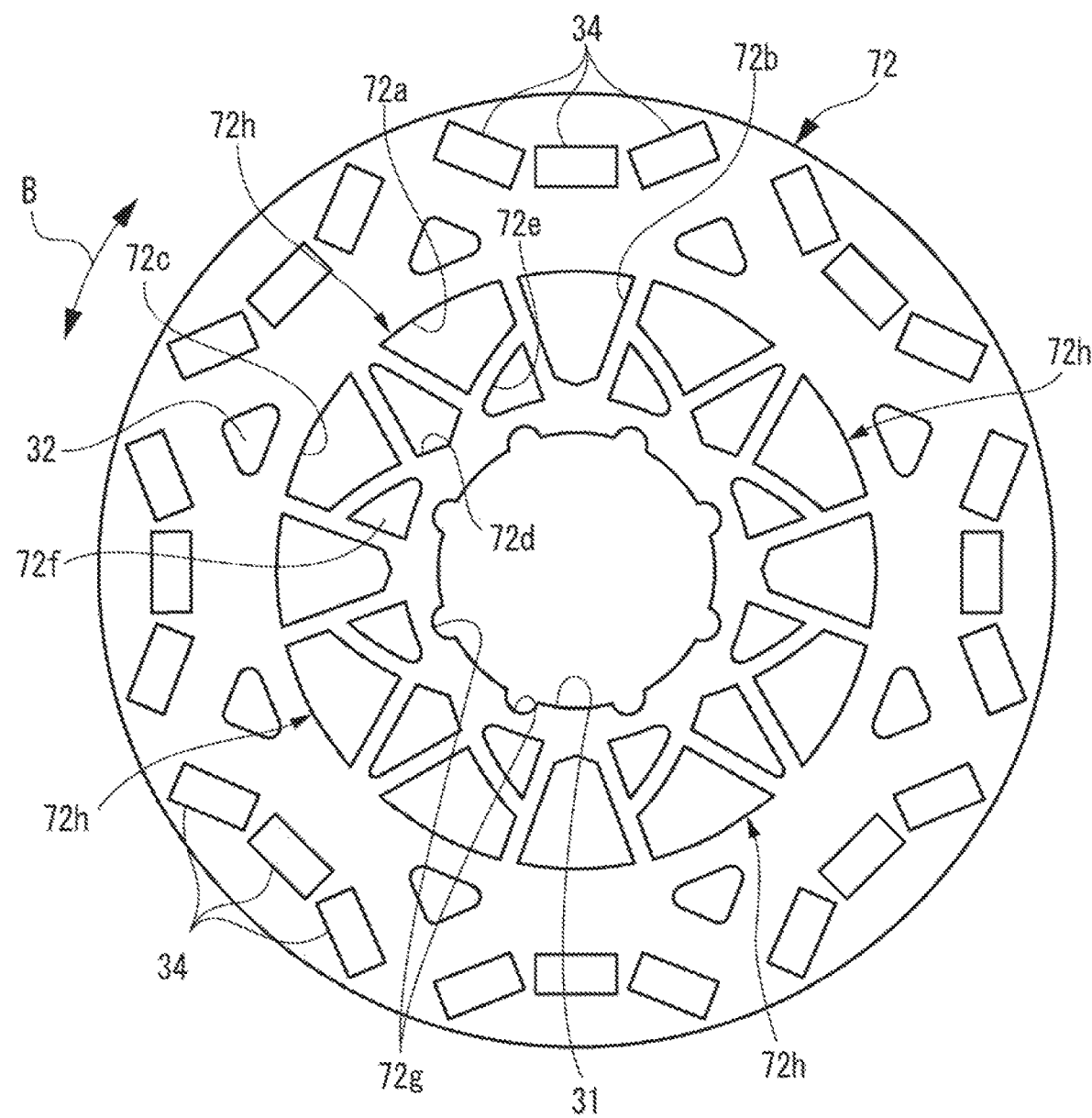
FIG. 5B is a front view of a supply side exclusive steel plate of the rotor of FIG. 1.

As illustrated in FIG. 5B, when six rooms 72a to 72f are considered as one set, the supply side exclusive steel plate 72 has four sets of connection room parts 72h arranged in the circumferential direction and cutout parts 72g corresponding to the refrigerant supply parts 23. The room 72a of the supply side exclusive steel plate 72 is arranged at the position overlapped with the heat exchange chamber 61 and the refrigerant discharge chamber 63 of the main steel plate 71. The room 72b of the supply side exclusive steel plate 72 is arranged at the position overlapped with the heat exchange chamber 61 and the refrigerant supply chamber 62 of the main steel plate 71. The room 72c of the supply side exclusive steel plate 72 is arranged at the position overlapped with the heat exchange chamber 61 and the refrigerant discharge chamber 63 of the main steel plate 71. The room 72d of the supply side exclusive steel plate 72 is arranged at the position overlapped with the refrigerant discharge chamber 63 of the main steel plate 71. The room 72e of the supply side exclusive steel plate 72 is arranged at the position overlapped with the connection chamber 64 and the refrigerant supply chamber 62 of the main steel plate 71. The room 72f of the supply side exclusive steel plate 72 is arranged at the position overlapped with the connection chamber 64 and the refrigerant supply chamber 62 of the main steel plate 71.

When the room 72b of the supply side exclusive steel plate 72 is overlapped with the heat exchange chamber 61 and the refrigerant supply chamber 62 of the main steel plate 71, a first passage 81 connecting the refrigerant supply chamber 62 and the heat exchange chamber 61 is formed. When the rooms 72a and 72c of the supply side exclusive steel plate 72 are overlapped with the heat exchange chamber 61 and the refrigerant discharge chamber 63 of the main steel plate 71, a second passage 82 connecting the heat exchange chamber 61 and the refrigerant discharge chamber 63 is formed. When the room 72e and the room 72f of the supply side exclusive steel plate 72 are overlapped with the connection chamber 64 and the refrigerant supply chamber 62 of the main steel plate 71, a supply side passage 83 connecting the refrigerant supply part 23 of the rotor shaft 20 and the refrigerant supply chamber 62 of the rotor core 30 is formed. That is, the supply side exclusive steel plate 72 includes the first passage 81, the second passage 82, and the supply side passage 83 which are formed by being overlapped with the main steel plate 71.

The refrigerant supply chambers 62 communicates through the supply side passages 83 with the refrigerant supply parts 23 adjacent to each other with the refrigerant supply chamber 62 interposed therebetween in the circumferential direction, and communicates through the first passages 81 with the heat exchange chambers 61 arranged on both sides in the circumferential direction with the refrigerant supply chamber 62 interposed therebetween.

The heat exchange chamber 61 communicates through the first passage 81 with the refrigerant supply chamber 62 at the outer portion in the radial direction, and communicates through the second passage 82 with the refrigerant discharge chamber 63 at the inner portion in the radial direction. The refrigerant Mc of low temperature has a heavy specific gravity, and thus the force flowing outward in the radial direction acts by a centrifugal force. Thus, when the heat exchange chamber 61 communicates with the refrigerant supply chamber 62 at the outer portion in the radial direction, the refrigerant M naturally flows from the refrigerant supply chamber 62 to the heat exchange chamber 61. Accordingly, the reverse flow of the refrigerant M is prevented. On the other hand, a refrigerant Mh of high temperature has a light specific gravity, and thus the force flowing inward in the radial direction selectively acts by the centrifugal force. Thus, when the heat exchange chamber 61 communicates with the refrigerant discharge chamber 63 at the inner portion in the radial direction, the refrigerant M flows from the heat exchange chamber 61 to the refrigerant discharge chamber 63.

In addition, the refrigerant discharge chamber 63 communicates through the second passages 82 with the heat exchange chambers 61 arranged on both sides in the circumferential direction with the refrigerant discharge chamber 63 interposed therebetween.

Figure 5C:
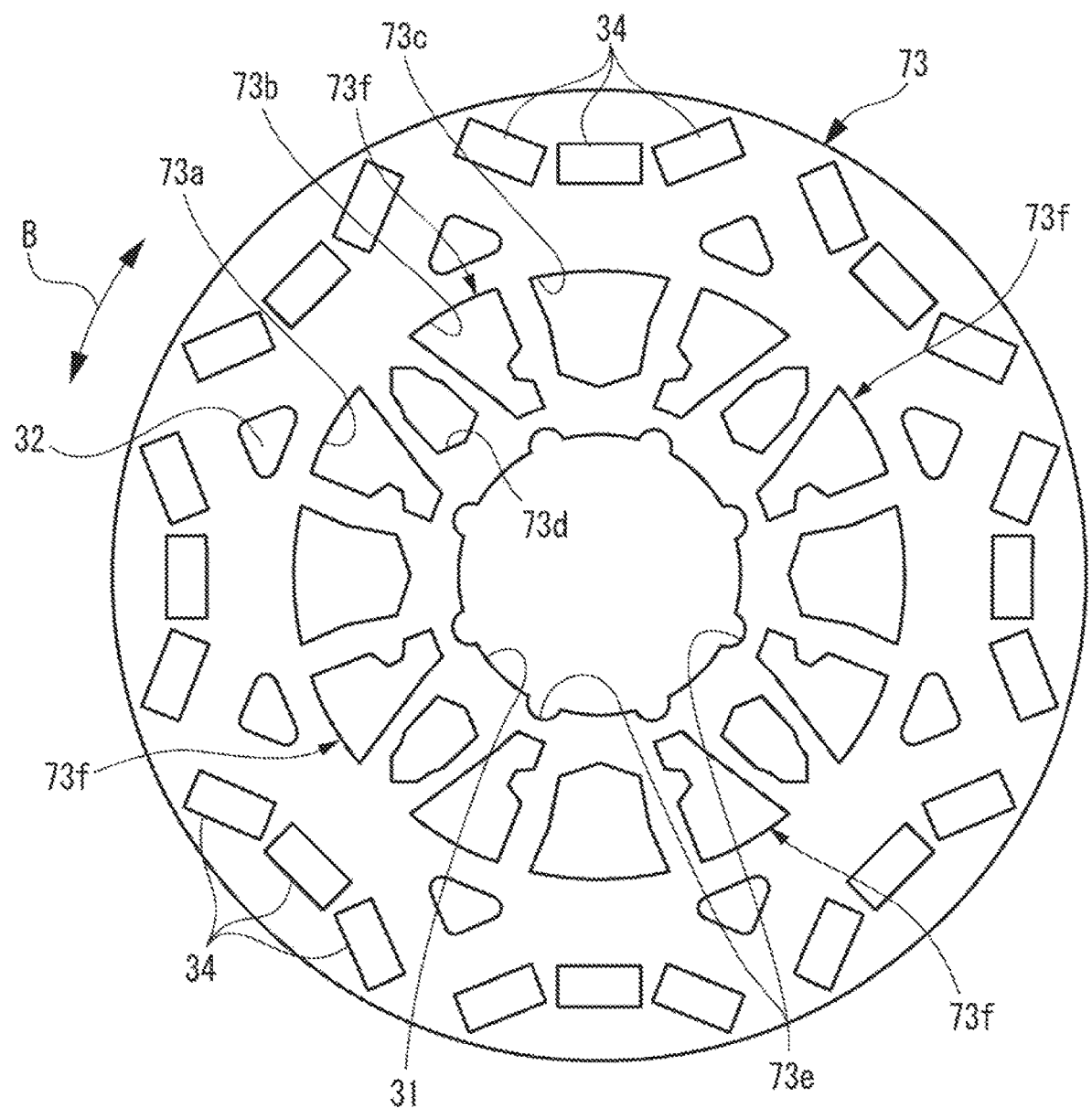
FIG. 5C is a front view of a discharge side exclusive steel plate of the rotor of FIG. 1.

As illustrated in FIG. 5C, when four rooms 73a to 73d are considered as one set, the discharge side exclusive steel plate 73 has four sets of connection room parts 73f arranged in the circumferential direction and cutout parts 73e corresponding to the refrigerant discharge parts 24. The room 73a of the discharge side exclusive steel plate 73 is arranged at the position overlapped with the heat exchange chamber 61, the refrigerant discharge chamber 63, and the connection chamber 64 of the main steel plate 71. The room 73b of the discharge side exclusive steel plate 73 is arranged at the position overlapped with the heat exchange chamber 61, the refrigerant discharge chamber 63, and the connection chamber 64 of the main steel plate 71. The room 73c of the discharge side exclusive steel plate 73 is arranged at the position overlapped with the heat exchange chamber 61 and the refrigerant supply chamber 62 of the main steel plate 71. The room 73d of the discharge side exclusive steel plate 73 is arranged at the position overlapped with the refrigerant discharge chamber 63 of the main steel plate 71.

When the room 73c of the discharge side exclusive steel plate 73 is overlapped with the heat exchange chamber 61 and the refrigerant supply chamber 62 of the main steel plate 71, the first passage 81 connecting the refrigerant supply chamber 62 and the heat exchange chamber 61 is formed. When the room 73a and the room 73b of the discharge side exclusive steel plate 73 are overlapped with the heat exchange chamber 61 and the refrigerant discharge chamber 63 of the main steel plate 71, the second passage 82 connecting the heat exchange chamber 61 and the refrigerant discharge chamber 63 is formed. When the rooms 73a and 73b of the discharge side exclusive steel plate 73 are overlapped with the refrigerant discharge chamber 63 and the connection chamber 64 of the main steel plate 71, a discharge side passage 84 connecting the refrigerant discharge part 24 of the rotor shaft 20 and the refrigerant discharge chamber 63 of the rotor core 30 is formed. That is, the discharge side exclusive steel plate 73 includes the first passage 81, the second passage 82, and the discharge side passage 84 which are formed by being overlapped with the main steel plate 71.

The refrigerant supply chamber 62 communicates through the first passages 81 with the heat exchange chambers 61 arranged on both sides in the circumferential direction with the refrigerant supply chamber 62 interposed therebetween. The heat exchange chamber 61 communicates through the first passage 81 with the refrigerant supply chamber 62 at the outer portion in the radial direction, and communicates through the second passage 82 with the refrigerant discharge chamber 63 at the inner portion in the radial direction. In addition, the refrigerant discharge chamber 63 communicates through the discharge side passages 84 with the refrigerant discharge parts 24 adjacent to each other in the circumferential direction with the refrigerant discharge chamber 63 interposed therebetween and communicates through the second passages 82 with the heat exchange chambers 61 arranged on both sides in the circumferential direction with the refrigerant discharge chamber 63 interposed therebetween.

As described above, in the main steel plate 71 arranged on one side (the left side in FIG. 2) in the axial direction of the rotor core 30, the connection chamber 64 communicates with the refrigerant supply part 23 and communicates with the refrigerant supply chamber 62. In the main steel plate 71 arranged on the other side (the right side in FIG. 2) in the axial direction, the connection chamber 64 communicates with the refrigerant discharge part 24 and communicates with the refrigerant discharge chamber 63. Therefore, the heat exchange chamber 61 communicates with the refrigerant supply part 23 on one side (the left side in FIG. 2) in the axial direction of the refrigerant passage 21 and communicates with the refrigerant discharge part 24 on the other side (the right side in FIG. 2) in the axial direction of the refrigerant passage 21.

The supply side exclusive steel plate 72 includes the first passage 81, the second passage 82, and the supply side passage 83, and the discharge side exclusive steel plate 73 includes the first passage 81, the second passage 82, and the discharge side passage 84. Thus, the same main steel plate 71 can be used on one side in the axial direction and the other side in the axial direction.

Next, the cooling effect of the rotor core 30 will be described. As illustrated in FIG. 3, the refrigerant M (Mc) of low temperature supplied to the refrigerant passage 21 (refrigerant supply passage 21a) flows to the refrigerant supply chamber 62 through the refrigerant supply part 23 and the connection chamber 64 and is supplied to the heat exchange chamber 61 therefrom. The refrigerant M (Mc) mainly exchanges heat with the rotor core 30 in the heat exchange chamber 61 (see arrow HC of FIG. 6). As illustrated in FIG. 4, the refrigerant M (Mh) after the heat exchange flows from the heat exchange chamber 61 to the refrigerant discharge chamber 63 and returns from the refrigerant discharge chamber 63 through the connection chamber 64 and the refrigerant discharge part 24 to the refrigerant passage 21 (refrigerant discharge passage 21b), so as to be discharged from the rotor shaft 20. As described above, when the refrigerant M (Mh) for cooling the rotor 10 is discharged from the rotor shaft 20, the loss of the kinetic energy of the rotor 10 can be suppressed, and the deterioration of the operating efficiency of the rotary electric machine including the rotor 10 can be suppressed.

When the refrigerant M flows to the refrigerant supply chamber 62, the heat exchange chamber 61, and the refrigerant discharge chamber 63 in the circumferential direction, the wide range of the rotor core 30 in the circumferential direction can be cooled, and the rotor 10 can be cooled uniformly. In addition, since the plural refrigerant supply parts 23 are provided to correspond to the heat exchange chambers 61 in the circumferential direction, the cold refrigerant M (Mc) is uniformly introduced into the rotor core 30 in the circumferential direction, so that the rotor 10 can be uniformly cooled in the circumferential direction and the axial direction.

Figure 6:
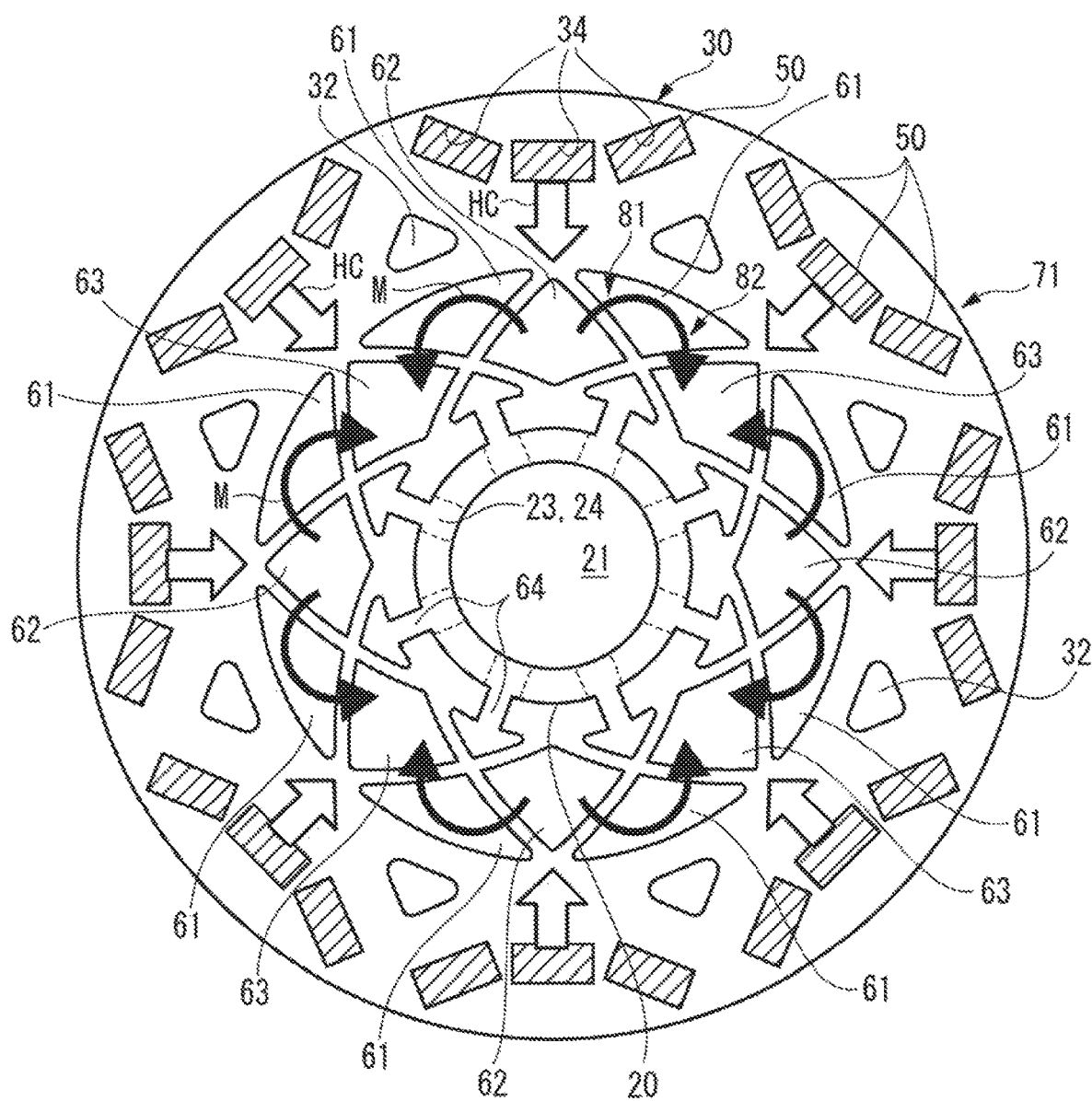
FIG. 6 is a view for explaining a cooling effect of the rotor of FIG. 1.

When the refrigerant M exchanges heat with the rotor core 30 in the heat exchange chamber 61 in which the circumferential length L1 is formed larger than the radial length L2, the wide range of the rotor core 30 in the circumferential direction can be cooled. Further, since the plural heat exchange chambers 61 are provided in the circumferential direction, and the refrigerant supply chamber 62 and the refrigerant discharge chamber 63 are provided with the heat exchange chamber 61 interposed therebetween in the circumferential direction, as illustrated in FIG. 6, the flow passages (first passage 81, second passage 82) connecting the heat exchange chamber 61 with the refrigerant supply chamber 62 and the refrigerant discharge chamber 63 are shortened, so that the rotor 10 can be cooled uniformly.

Figure 7:
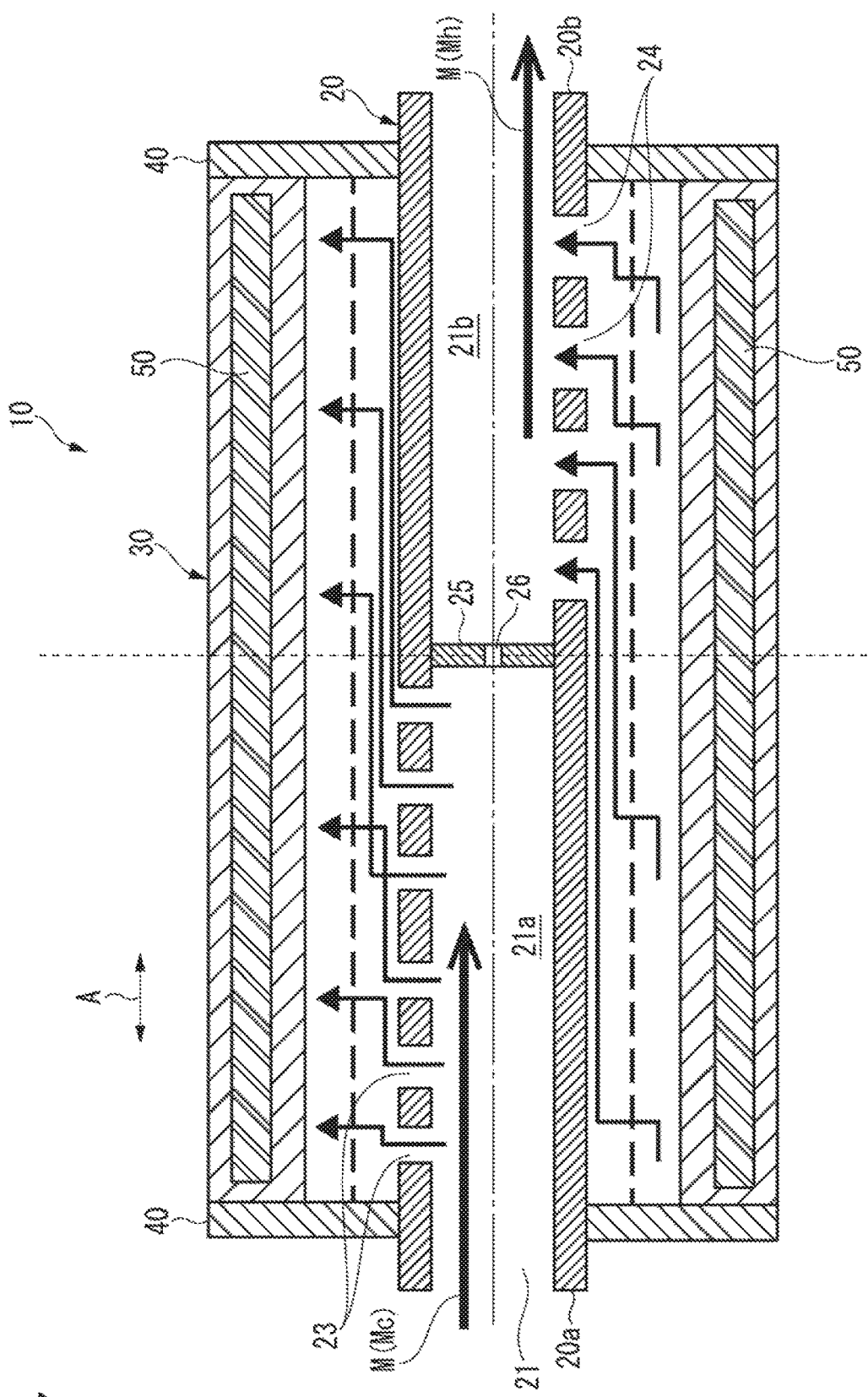
FIG. 7 is a sectional view schematically illustrating a rotor of a rotary electric machine of a modification.

Next, a modification of this embodiment will be described with reference to FIG. 7. In the rotor 10 of this modification, an air hole 26 is provided in the passage partition part 25 of the rotor shaft 20. Incidentally, the configuration other than the air hole 26 is the same as that of the above-described embodiment and is denoted by the same reference numeral as in FIG. 7, and the description thereof is not given.

The air hole 26 is a small hole provided at the center of the passage partition part 25, that is, the shaft center of the rotor shaft 20. Incidentally, the air hole 26 is preferably made small as much as possible in order to avoid the leakage of the refrigerant M from one side (the left side in FIG. 2) of the refrigerant passage 21 in the axial direction to the other side (the right side in FIG. 2) of the refrigerant passage 21 in the axial direction. The air hole 26 may be configured to be one hole or two or more holes.

Hereinafter, the operational effect of the air hole 26 provided in the passage partition part 25 will be described. Fine air is dissolved in the refrigerant flowing in the refrigerant passage 21, and the air is centrifuged and separated in the rotating rotor shaft 20 to become bubbles and is extruded to the center. The air once gathered in the center has no place to go and remains in the center. There is a concern that the remaining air increases over time to eventually disrupt cooling. In this regard, in this modification, the air hole 26 is provided in the center of the passage partition part 25. Accordingly, when the air or bubbles lower in specific gravity than the refrigerant M flows to the discharge side, that is, the other side (the right side in FIG. 2) of the refrigerant passage 21 in the axial direction, the cooling performance can be suppressed from being deteriorated by the air dissolved in the refrigerant M.

Incidentally, the above-described embodiments may be modified or improved as appropriate. For example, in the above-described embodiments, the heat exchange chambers 61 are provided in the rotor core 30 as many (eight) as the magnetic poles 42. However, the number of the heat exchange chambers 61 is not limited thereto. The heat exchange chambers 61 may be provided more than the magnetic poles 42.

The passage partition part 25 is not limited to be arranged in the central portion of the refrigerant passage 21 in the axial direction. The passage partition part may be arranged closer to one side of the refrigerant passage 21 in the axial direction (the left side in FIG. 2) or the other side (the right side in FIG. 2) in the axial direction from the central portion in the axial direction.

At least the following is described in this specification. Incidentally, the parentheses indicate corresponding components or the like in the above-described embodiments. However, the invention is not limited thereto.

(1) A rotor of a rotary electric machine (rotor 10) includes:
a rotor core (rotor core 30):
a plurality of magnets (magnet 50) arranged in the rotor core; and
a rotor shaft (rotor shaft 20) which rotates integrally with the rotor core,
wherein the rotor shaft includes:
a refrigerant passage (refrigerant passage 21) through which a refrigerant (refrigerant M) passes,
a refrigerant supply part (refrigerant supply part 23) which is provided on one side of the refrigerant passage in an axial direction and configured to supply the refrigerant from the rotor shaft to the rotor core,
a refrigerant discharge part (refrigerant discharge part 24) which is provided on the otherside of the refrigerant passage in the axial direction and configured to return the refrigerant from the rotor core to the rotor shaft, and
a passage partition part (passage partition part 25) which is configured to block flow of the refrigerant between the one side of the refrigerant passage in the axial direction and the other side in the axial direction,
the rotor core includes:
a plurality of heat exchange chambers (heat exchange chamber 61) which are provided in the circumferential direction, wherein the heat exchange chamber has a circumferential length (circumferential length L1) which is a maximum length in a circumferential direction larger than a radial length (radial length L2) which is a maximum length in a radial direction, and the heat exchange chamber communicates with the refrigerant supply part on one side of the refrigerant passage in the axial direction and communicates with the refrigerant discharge part on the other side of the refrigerant passage in the axial direction.

According to (1), the refrigerant supplied to the refrigerant passage flows from the refrigerant supply part provided on one side of the refrigerant passage in the axial direction into the heat exchange chamber, so as to exchange heat with the rotor core in the heat exchange chamber. The refrigerant after the heat exchange is discharged from the heat exchange chamber through the refrigerant discharge part provided in the other side of the refrigerant passage in the axial direction to the refrigerant passage. Therefore, when the refrigerant for cooling the rotor is discharged from the rotor shaft, the loss of the kinetic energy of the rotor can be suppressed, and the deterioration of the operating efficiency of the rotary electric machine can be suppressed. In addition, the refrigerant exchanges heat with the rotor core in the heat exchange chamber formed such that the circumferential length is larger than the radial length, whereby a wide range of the rotor core in the circumferential direction can be cooled. Further, since a plurality of heat exchange chambers are provided in the circumferential direction, each flow passage connected with the heat exchange chambers in the circumferential direction is shortened, whereby the rotor can be cooled uniformly.

(2) In the rotor of the rotary electric machine according to (1),
the rotor core further includes:
a refrigerant supply chamber (refrigerant supply chamber 62) which is arranged to be separate from the heat exchange chamber in the circumferential direction; and
a refrigerant discharge chamber (refrigerant discharge chamber 63) which is arranged to be separate from the heat exchange chamber in the circumferential direction,
the refrigerant supply chamber communicates with the refrigerant supply part and communicates with the heat exchange chamber, and
the refrigerant discharge chamber communicates with the refrigerant discharge part and communicates with the heat exchange chamber.

According to (2), the refrigerant supplied to the refrigerant passage flows from the refrigerant supply part to the refrigerant supply chamber, the heat exchange chamber, and the refrigerant discharge chamber in the circumferential direction and is discharged from the refrigerant discharge part to the refrigerant passage again. Therefore, the wide range of the rotor core in the circumferential direction can be cooled, and the rotor can be cooled uniformly.

(3) A rotor of a rotary electric machine (rotor 10) includes:
a rotor core (rotor core 30):
a plurality of magnets (magnet 50) arranged in the rotor core; and
a rotor shaft (rotor shaft 20) which rotates integrally with the rotor core,
wherein the rotor shaft includes:
a refrigerant passage (refrigerant passage 21) through which a refrigerant passes, a refrigerant supply part (refrigerant supply part 23) which is provided on one side of the refrigerant passage in an axial direction and supplies the refrigerant from the rotor shaft to the rotor core, a refrigerant discharge part (refrigerant discharge part 24) which is provided on the other side of the refrigerant passage in the axial direction and configured to return the refrigerant from the rotor core to the rotor shaft, and a passage partition part (passage partition part 25) which is configured to block flow of the refrigerant between the one side of the refrigerant passage in the axial direction and the other side of the refrigerant passage in the axial direction, wherein the rotor core includes:

a plurality of heat exchange chambers (heat exchange chamber 61) which are provided in the circumferential direction, a refrigerant supply chamber (refrigerant supply chamber 62) which is arranged to be separate from the heat exchange chamber in the circumferential direction, and a refrigerant discharge chamber (refrigerant discharge chamber 63) which is arranged to be separate from the heat exchange chamber in the circumferential direction, wherein the refrigerant supply chamber communicates with the refrigerant supply part and communicates with the heat exchange chamber, and the refrigerant discharge chamber communicates with the refrigerant discharge part and communicates with the heat exchange chamber.

According to (3), the refrigerant supplied to the refrigerant passage of the rotor shaft flows from the refrigerant supply part provided on one side of the refrigerant passage in the axial direction into the heat exchange chamber, so as to exchange heat with the rotor core in the heat exchange chamber. The refrigerant after the heat exchange is discharged from the heat exchange chamber through the refrigerant discharge part provided in the other side of the refrigerant passage in the axial direction to the refrigerant passage. Therefore, when the refrigerant for cooling the rotor is discharged from the rotor shaft, the loss of the kinetic energy of the rotor can be suppressed, and the deterioration of the operating efficiency of the rotary electric machine can be suppressed. In addition, the refrigerant flows from the refrigerant supply part to the refrigerant supply chamber, the heat exchange chamber, and the refrigerant discharge chamber in the circumferential direction to be discharged to the refrigerant discharge part, whereby the wide range of the circumferential direction can be cooled. Further, since the plurality of heat exchange chambers are provided in the circumferential direction, each flow passage is shortened, whereby the rotor can be cooled uniformly in the axial direction as well as in the circumferential direction.

(4) In the rotor of the rotary electric machine according to (2) or (3), the heat exchange chamber communicates with the refrigerant supply chamber at an outer portion in the radial direction and communicates with the refrigerant discharge chamber at an inner portion in the radial direction.

According to (4), the refrigerant of low temperature has a heavy specific gravity, and thus the force flowing outward in the radial direction acts by a centrifugal force. Thus, the heat exchange chamber communicates with the refrigerant supply chamber at the outer portion in the radial direction, so that the refrigerant naturally flows from the refrigerant supply chamber to the heat exchange chamber, whereby the reverse flow is prevented. On the other hand, the refrigerant of high temperature has a light specific gravity, and thus the force flowing inward in the radial direction acts selectively. Thus, the heat exchange chamber communicates with the refrigerant discharge chamber at the inner portion in the radial direction, so that the refrigerant flows from the heat exchange chamber to the refrigerant discharge chamber, whereby the reverse flow is prevented.

(5) In the rotor of the rotary electric machine according to any one of (2) to (4), the refrigerant supply chamber communicates with the heat exchange chambers arranged on both sides in the circumferential direction with the refrigerant supply chamber interposed therebetween, and the refrigerant discharge chamber communicates with the heat exchange chambers arranged on both sides in the circumferential direction with the refrigerant discharge chamber interposed therebetween.

According to (5), the refrigerant supply chamber is shared by the heat exchange chambers arranged on both sides in the circumferential direction with the refrigerant supply chamber interposed therebetween, and the refrigerant discharge chamber is shared by the heat exchange chambers arranged on both sides in the circumferential direction with the refrigerant discharge chamber interposed therebetween, whereby the rotor core can be manufactured easily.

(6) In the rotor of the rotary electric machine according to any one of (2) to (5), the rotor core is formed by laminating a plurality of steel plates, the rotor core further includes a connection chamber (connection chamber 64).

in the steel plate arranged on one side in the axial direction, the connection chamber communicates with the refrigerant supply part and communicates with the refrigerant supply chamber, and in the steel plate arranged on the other side in the axial direction, the connection chamber communicates with the refrigerant discharge part and communicates with the refrigerant discharge chamber.

According to (6), in the steel plate arranged on one side in the rotor core in the axial direction, the connection chamber communicates with the refrigerant supply part and communicates with the refrigerant supply chamber. In the steel plate arranged on the other side in the axial direction, the connection chamber communicates with the refrigerant discharge part and communicates with the refrigerant discharge chamber. Thus, the same steel plate can be used on one side in the axial direction and the other side in the axial direction.

(7) In the rotor of the rotary electric machine according to (6), the rotor core includes:

a main steel plate (main steel plate 71) including the refrigerant supply chamber, the heat exchange chamber, the refrigerant discharge chamber, and the connection chamber;

a supply side exclusive steel plate (supply side exclusive steel plate 72) which includes a first passage (the first passage 81) connecting the refrigerant supply chamber and the heat exchange chamber, a second passage (second passage 82) connecting the heat exchange chamber and the refrigerant discharge chamber, and a supply side passage (supply side passage 83) connecting the refrigerant supply part and the refrigerant supply chamber; and a discharge side exclusive steel plate (discharge side exclusive steel plate 73) which includes the first passage, the second passage, and a discharge side passage (discharge side passage 84) connecting the refrigerant supply part and the refrigerant supply chamber.

According to (7), the rotor core can be configured by three kinds of steel plates including the main steel plate, the supply side exclusive steel plate, and the discharge side exclusive steel plate. Thus, the steel plate can be manufactured and managed easily.

(8) In the rotor of the rotary electric machine according to any one of (1) to (7), a plurality of the refrigerant supply parts are provided on one axial side of the refrigerant passage in the axial direction and the circumferential direction.

According to (8), the refrigerant is introduced uniformly into the rotor core in the circumferential direction and the axial direction, and the rotor can be cooled uniformly in the circumferential direction and the axial direction.

(9) In the rotor of the rotary electric machine according to any one of (1) to (8), a plurality of magnetic poles (magnetic pole 42) each configured by at least one magnet are provided in the rotor, the plurality of heat exchange chambers are arranged at equal intervals in the circumferential direction, and the number of the heat exchange chambers is equal to or more than the number of the magnetic poles.

According to (9), when the number of the heat exchange chambers is equal to or more than the number of the magnetic poles, the magnet which is a heating element can be cooled appropriately.

(10) In the rotor of the rotary electric machine according to any one of (1) to (9), an air hole (air hole 26) is provided in the passage partition part.

According to (10), the air hole is provided in the passage partition part, and thus the air dissolved in the refrigerant M remains in the passage partition part, thereby suppressing deterioration of the cooling performance.

The invention claimed is:

1. A rotor of a rotary electric machine comprising:
   a rotor core;
   a plurality of magnets arranged in the rotor core; and
   a rotor shaft which rotates integrally with the rotor core,
   wherein the rotor shaft includes:
      a refrigerant passage through which a refrigerant passes;
      a refrigerant supply part which is provided on one side of the refrigerant passage in an axial direction and configured to supply the refrigerant from the rotor shaft to the rotor core;
      a refrigerant discharge part which is provided on the other side of the refrigerant passage in the axial direction and configured to return the refrigerant from the rotor core to the rotor shaft, and
      a passage partition part which is configured to block flow of the refrigerant between the one side of the refrigerant passage in the axial direction and the other side of the refrigerant passage in the axial direction,
   wherein the rotor core includes:
      a plurality of heat exchange chambers which are provided in a circumferential direction,
      each heat exchange chamber of the plurality of heat exchange chambers has a circumferential length, which is a maximum length in a circumferential direction, larger than a radial length which is a maximum length in a radial direction, and
      each heat exchange chamber of the plurality of heat exchange chambers communicates with the refrigerant supply part on one side of the refrigerant passage in the axial direction and communicates with the refrigerant discharge part on the other side of the refrigerant passage in the axial direction.

2. The rotor of the rotary electric machine according to claim 1, wherein
   the rotor core further includes:
      a refrigerant supply chamber which is arranged to be separate from the plurality of heat exchange chambers in the circumferential direction; and
      a refrigerant discharge chamber which is arranged to be separate from the plurality of heat exchange chambers in the circumferential direction,
   the refrigerant supply chamber communicates with the refrigerant supply part and communicates with the plurality of heat exchange chambers, and
   the refrigerant discharge chamber communicates with the refrigerant discharge part and communicates with the plurality of heat exchange chambers.

3. The rotor of the rotary electric machine according to claim 2, wherein
   the plurality of heat exchange chambers communicates with the refrigerant supply chamber at an outer portion in the radial direction and communicates with the refrigerant discharge chamber at an inner portion in the radial direction.

4. The rotor of the rotary electric machine according to claim 2, wherein
   the refrigerant supply chamber communicates with the plurality of heat exchange chambers arranged on both sides in the circumferential direction with the refrigerant supply chamber interposed therebetween, and
   the refrigerant discharge chamber communicates with the plurality of heat exchange chambers arranged on both sides in the circumferential direction with the refrigerant discharge chamber interposed therebetween.

5. The rotor of the rotary electric machine according to claim 2, wherein
   the rotor core is formed by laminating a plurality of steel plates,
   the rotor core further includes a connection chamber,
   in a steel plate of the plurality of steel plates arranged on one side in the axial direction, the connection chamber communicates with the refrigerant supply part and communicates with the refrigerant supply chamber, and
   in a steel plate of the plurality of steel plates arranged on the other side in the axial direction, the connection chamber communicates with the refrigerant discharge part and communicates with the refrigerant discharge chamber.

6. The rotor of the rotary electric machine according to claim 5, wherein
   the rotor core includes:
      a main steel plate including the refrigerant supply chamber, the plurality of heat exchange chambers, the refrigerant discharge chamber, and the connection chamber;
      a supply side exclusive steel plate which includes a first passage connecting the refrigerant supply chamber and the plurality of heat exchange chambers, a second passage connecting the plurality of heat exchange chambers and the refrigerant discharge chamber, and a supply side passage connecting the refrigerant supply part and the refrigerant supply chamber; and
      a discharge side exclusive steel plate which includes the first passage, the second passage, and a discharge side passage connecting the refrigerant supply part and the refrigerant supply chamber.

7. The rotor of the rotary electric machine according to claim 1, wherein
a plurality of the refrigerant supply parts are provided on one axial side of the refrigerant passage in the axial direction and the circumferential direction.

8. The rotor of the rotary electric machine according to claim 1, wherein
a plurality of magnetic poles each configured by at least one magnet are provided in the rotor,
the plurality of heat exchange chambers are arranged at equal intervals in the circumferential direction, and
a number of the plurality of heat exchange chambers is equal to or more than a number of the magnetic poles.

9. The rotor of the rotary electric machine according to claim 1, wherein
an air hole is provided in the passage partition part.

10. A rotor of a rotary electric machine comprising:
a rotor core;
a plurality of magnets arranged in the rotor core; and
a rotor shaft which rotates integrally with the rotor core, wherein the rotor shaft includes:
　a refrigerant passage through which a refrigerant passes,
　a refrigerant supply part which is provided on one side of the refrigerant passage in an axial direction and supplies the refrigerant from the rotor shaft to the rotor core,
　a refrigerant discharge part which is provided on the other side of the refrigerant passage in the axial direction and configured to return the refrigerant from the rotor core to the rotor shaft, and
　a passage partition part which is configured to block flow of the refrigerant between the one side of the refrigerant passage in the axial direction and the other side of the refrigerant passage in the axial direction, wherein the rotor core includes:
a plurality of heat exchange chambers which are provided in a circumferential direction,
a refrigerant supply chamber which is arranged to be separate from the plurality of heat exchange chambers in the circumferential direction, and
a refrigerant discharge chamber which is arranged to be separate from the plurality of heat exchange chambers in the circumferential direction, wherein
　the refrigerant supply chamber communicates with the refrigerant supply part and communicates with the plurality of heat exchange chambers, and
　the refrigerant discharge chamber communicates with the refrigerant discharge part and communicates with the plurality of heat exchange chambers.

* * * * *